(12) United States Patent
Freund (10) Patent No.: US 9,275,016 B1
(45) Date of Patent: Mar. 1, 2016

(54) CONTENT ITEM TRANSFORMATIONS FOR IMAGE OVERLAYS

(75) Inventor: Martin Freund, Mountain View, CA (US)

(73) Assignee: Google Inc., Mountain View, CA (US)

(*) Notice: Subject to any disclaimer, the term of this patent is extended or adjusted under 35 U.S.C. 154(b) by 453 days.

(21) Appl. No.: 13/472,821

(22) Filed: May 16, 2012

(51) Int. Cl.
*G06F 17/21* (2006.01)
*G06F 17/30* (2006.01)
*G06F 3/12* (2006.01)

(52) U.S. Cl.
CPC ........ *G06F 17/211* (2013.01); *G06F 17/30719* (2013.01)

(58) Field of Classification Search
CPC .............. G09G 2340/12; G06F 17/211; G06F 17/30719; G06F 3/1243
USPC ........................... 345/620–641; 715/247–524
See application file for complete search history.

(56) References Cited

U.S. PATENT DOCUMENTS

| 8,281,332 | B2 | 10/2012 | Rajaraman et al. |
| 2007/0044018 | A1* | 2/2007 | Hanechak ..................... 715/531 |
| 2008/0092071 | A1* | 4/2008 | Chiu ............................. 715/764 |
| 2009/0198607 | A1* | 8/2009 | Badger et al. ................... 705/37 |
| 2009/0274391 | A1 | 11/2009 | Arcas et al. |
| 2010/0231609 | A1* | 9/2010 | Chatting et al. ............... 345/660 |
| 2012/0320091 | A1 | 12/2012 | Rajaraman et al. |
| 2013/0006761 | A1 | 1/2013 | Warren et al. |

* cited by examiner

*Primary Examiner* — Matthew D Salvucci
(74) *Attorney, Agent, or Firm* — Foley & Lardner LLP; John D. Lanza

(57) ABSTRACT

Methods, and systems, including computer programs encoded on computer-readable storage mediums, including a method for adjusting content item configurations for use as overlays for images. The method includes receiving a request for an overlay for an image; determining image parameters specifying dimensional aspects of the image including a width of the image; selecting a content item, having a first configuration specifying a first width of the content item, from content items relevant to the image; adjusting the first configuration of the content item to a second configuration to generate an adjusted content item including adjusting the first width of the content item to a second width that is a same width as the width of the image without changing a perspective of content in the content item; and providing the adjusted content item in the second configuration as an overlay for the image to satisfy the request.

18 Claims, 6 Drawing Sheets

CONTENT ITEM TRANSFORMATIONS FOR IMAGE OVERLAYS

BACKGROUND

This specification generally relates to information presentation.

The Internet provides access to a wide variety of resources. For example, video and/or audio files, web pages for particular subjects or particular news articles and other content are accessible over the Internet. Access to these resources presents opportunities for content items (e.g., advertisements) to be provided with the resources.

Content sponsors (e.g., advertisers) can distribute their content items to particular audiences based at least in part on keywords, topics or subject matter associated with the content items. For example, content sponsors can select keywords relevant to the subject matter of resources that their desired audiences are likely to access so that when users access such resources the content sponsor's content items are eligible to be provided to the users along with the resources. The content items can be provided in a variety of forms, for example, as banners, wall paper, interstitial or video formats to name just a few.

SUMMARY

In general, one aspect of the subject matter described in this specification can be implemented in methods that include receiving request data specifying a request for an overlay for an image; determining image parameters specifying a plurality of dimensional aspects of the image including a width of the image; selecting a content item, having a first configuration specifying a first width of the content item, from a plurality of content items relevant to the image; adjusting, by one or more data processors, the first configuration of the content item to a second configuration to generate an adjusted content item including adjusting the first width of the content item to a second width that is a same width as the width of the image without changing a perspective of content in the content item; and providing the adjusted content item in the second configuration as an overlay for the image to satisfy the request. Other embodiments of this aspect include corresponding systems, apparatus, and computer programs, configured to perform the actions of the methods, encoded on computer storage devices.

These and other embodiments can each optionally include one or more of the following features. The first width and the width of the image can be in terms of pixels. The first width can be greater than the width of the image, the content of the content item can include at least one line of text and the method can include truncating the at least one line of text to fit within the width of the image. The content item can be an image advertisement. The content item can be a text advertisement.

The method can also include determining that the truncated line of text does not exceed a truncation threshold based on ratio of a portion of the at least one line of text that was truncated to a portion of the at least one line of text that was not truncated and adjusting the first configuration of the content item in response to determining that the truncated line of text does not exceed the truncation threshold.

The content of the content item can include multiple lines of text and the method can provide instructions to present the adjusted content item in an expanded state including the multiple lines of text during a first period of time and to present the adjusted content item in a collapsed state having fewer than all of the multiple lines of text after the first period. The method can include selecting the content item in response to determining that a publisher of the image is participating in an overlay program. The method can also include accessing the image parameters from a data store.

The method can also include analyzing content of the image and selecting the content item, which has a subject matter that is relevant to the content of the image, based at least in part on the analysis. The method can also include determining a publisher of the image is an approved publisher; accessing metadata for the image specified by the publisher; and in response to determining the publisher is an approved publisher, selecting the content item based at least in part on the metadata for the image. The method can also include analyzing textual content associated with the image and selecting the content item, which has a subject matter that is relevant to the textual content associated with the image, based at least in part on the analysis.

The method can also include providing an interface to a publisher of the image to allow the publisher to select whether or not content items can be overlaid on the image. The method can also include providing an interface to a content sponsor for enabling a content item in a campaign to be used as an overlay.

Particular implementations of the subject matter described in this specification can be implemented to realize none, one or more of the following advantages. A content item (e.g., advertisement) provided by a content sponsor (e.g., advertiser) and having a first configuration (e.g., a three line text advertisement) can be automatically transformed to have a different configuration appropriate for use as an overlay for an image to which the content item is relevant. Thus the content sponsor does not have to generate numerous different configurations of a content item and designate each particular configuration for use with various images and image configurations (e.g., sizes). This reduces the burden on and costs to a content sponsor as multiple configurations of a single content item are not required to be generated and stored for the content item to be used as an image overlay for various images.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various figures indicate like elements.

DETAILED DESCRIPTION

This specification describes systems, apparatuses and methods for adjusting the configuration of an existing content item (e.g., advertisement) to a configuration suitable or appropriate for use as an image overlay. An overlay is a content item that is "laid over" an image and occupies real estate associated by (and potentially covers up) at least part of the image. The content item can include a message relevant to one or more of the user, the context of display, current factors and/or the image that it overlays.

More particularly, one or more dimensional aspects of the configuration of an existing content item (e.g., width) is/are adjusted to match or align with the corresponding dimensional aspect(s) of the image that it will overlay in response to the content item being selected as an overlay for the image. For example, an existing content item such as a three line text advertisement is selected for use as an overlay for an image on a publisher's web page (e.g., as the subject matter of the advertisement is relevant to the subject matter of the image). In response to the selection, the configuration of the content item is adjusted to match at least one dimensional aspect of the image, for example, the width of the image so that the widths of the image and the content item are the same. In this example, the configuration of the content item is adjusted or transformed to ensure the content item "fits" the image once it is overlaid on the image (e.g., the content item lies within the borders or boundaries of the image).

The transformed content item can be initially overlaid on the image in an expanded state to draw attention to the content item and present detailed information about the subject matter of the content item (e.g., at least portions of all three lines of text from a three line text advertisement). In some implementations, after a certain period of time from the initial display of the content item in the expanded state, the content item can be automatically collapsed to a collapsed state to allow more (or an expanded version) of the image it overlays to be visible and less of the content item to be visible. In some implementations, the collapsed state reduces the portion of the image overlaid by the content item while still providing some information relevant to the subject matter of the content item (e.g., only one line of text from the three line text advertisement), although less information than that shown in the expanded state. In some implementations, only a control is presented/available when in the collapsed state to ensure a maximum amount of the image is displayed. In some implementations, a content item adjustment system adjusts configurations of content items for use as image overlays. The operation of the content item adjustment system is described below with reference to FIG. 1.

Figure 1:
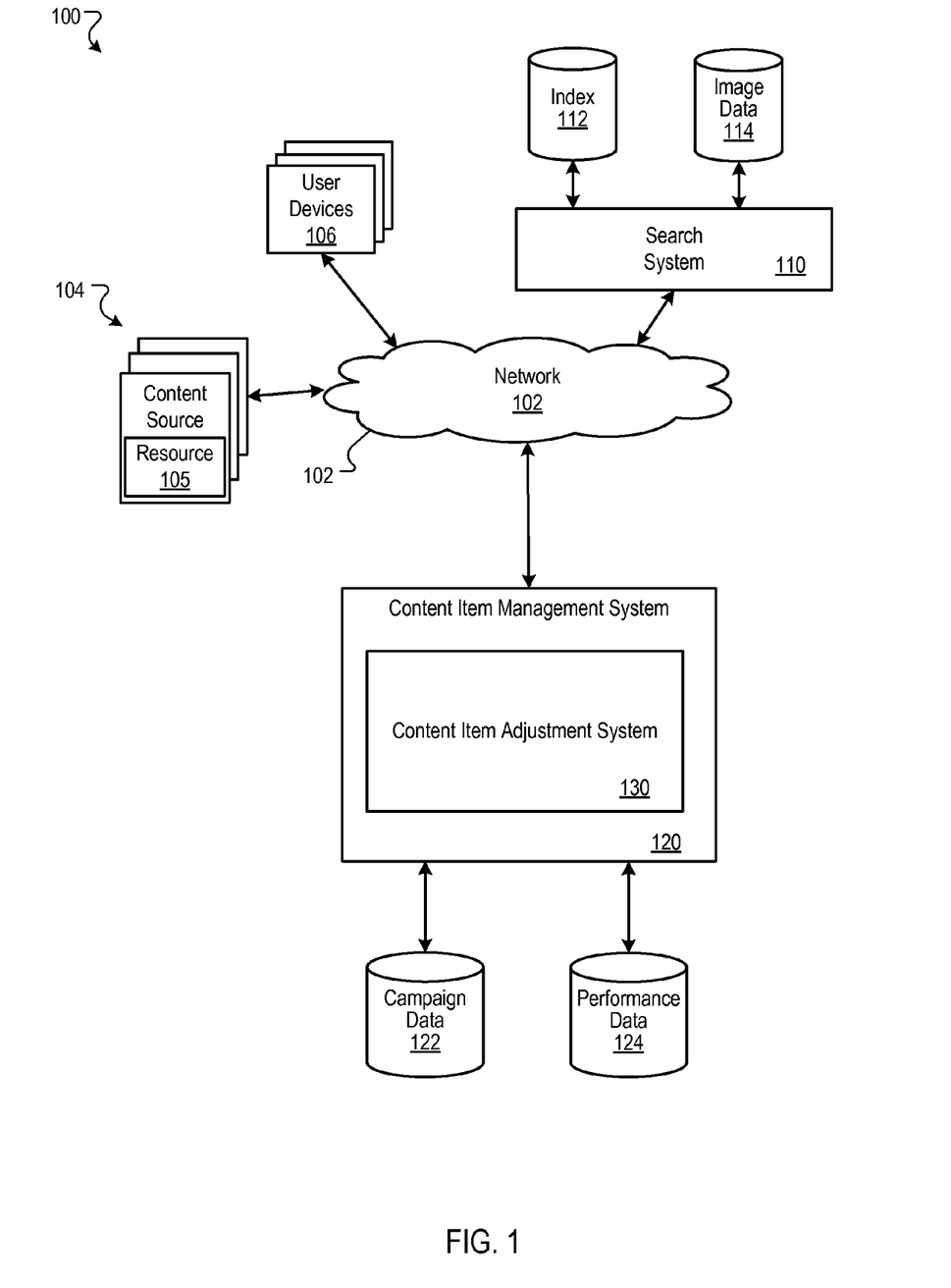
FIG. 1 is a block diagram of an example content item adjustment system.

FIG. 1 is a block diagram of an example content item adjustment system 130. A computer network 102, such as a local area network (LAN), wide area network (WAN), the Internet, or a combination thereof, connects content sources 104 (e.g., web sites), user devices 106, the search system 110, a content item management system 120 and the content item adjustment system 130. The environment 100 may include many thousands of web sites 104 and user devices 106.

A content source 104 includes one or more resources 105 associated with a content source locator (e.g., domain name) and hosted by one or more servers. An example content source 104 is a collection of web pages formatted in hypertext markup language (HTML) that can contain text, images, multimedia content, and programming elements, such as scripts. Each content source 104 is maintained by/associated with a content publisher, which is an entity that controls, manages and/or owns the content source 104.

A resource 105 is any data that can be provided by the publisher over the network 102 and that is associated with a resource address. Resources 105 include HTML pages, word processing documents, portable document format (PDF) documents, images, video, and feed sources, to name just a few. The resources 105 can include content, such as words, phrases, pictures, and so on, and may include embedded information (such as meta information and hyperlinks) and/or embedded instructions (such as scripts).

A user device 106 is an electronic device that is under the control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102. The web browser can enable a user to display and interact with text, images, videos, music and other information typically located on a web page at a website/content resource 104 on the world wide web or a local area network.

To facilitate searching of these resources 105, the search system 110 identifies the resources 105 by crawling the content sources 104 and indexing the resources 105 available from the content sources 104. The indexed and, optionally, cached copies of the resources 105, are stored in an index 112.

In some implementations, as the search system 110 crawls the resources 105, the search system 110 identifies image content on the resources 105 (e.g., images in the form of jpeg, gif, or png files) and determines and stores image parameters for the image content in the image data store 114. The image parameters can be indexed by the respective images and/or identifiers for the resources 105 hosting or including the images. The image parameters can include dimensional aspects of images such as the height and width of images, and the relative position of image on the hosting resource 105 as well as the colors of the image and the identification of portions of interest of the image and portions of the image over which content items cannot be overlaid. The image parameters can be measured or defined, for example, in terms of pixels, or metric or SAE units. In some implementations, the search system 110 parses the Document Object Model (DOM) or the HTML of the resources 105 to identify the image content and determine the corresponding image parameters of the image content of the respective resources 105. In some implementation, another different system can determine/provide the image parameters.

The content item management system 120 facilitates the provisioning of content items with the resources 105. In particular, the content item management system 120 allows content sponsors (e.g., advertisers) to define rules that take into account attributes, for example, of particular user devices 106 to provide content to the users. Example rules include keyword rules in which a content sponsor provides bids for keywords that are present in either search queries or webpage content or otherwise relate to the subject matter of the search queries or web page content. Content items that are associated with keywords having bids that result in a content item placement opportunity (e.g., an opportunity to overlay a content item on an image) being awarded in response to an auction are selected for display with the relevant resources 105. Other selection means can be used (e.g., a reservation system).

Content items can be provided for display on or with many different resources 105. For example, a resource 105 can include instructions (e.g., available from or provided by the content item adjustment system 130) that cause the user device 106 accessing the resource 105 to request one or more content items from the content item management system 120. The request includes a publisher/resource 105 identifier and, optionally, keyword identifiers related to the content or subject matter of the resource 105. The content item management system 120, in turn, provides content items to the particular user device 106 (e.g., content items relevant to the subject matter of the resource 105).

The content item management system 120 can include a data storage system that stores campaign data 122 and performance data 124. The campaign data 122 stores content items (e.g., advertisement creatives), content item distribution rules, and budgeting information for content sponsors. The performance data 124 stores data indicating the performance of the content items that are served. Such performance data can include, for example, click through rates for content items, the number of impressions, and the number of conversions for respective content items.

The campaign data 122 and the performance data 124 can be used as input parameters to an auction or other evaluation process for selecting content items to provide along with resources 105. In some implementations, the content item management system 120, in response to each request for content items, conducts an auction to select content items that are provided in response to the request. The content items are ranked according to a score that, in some implementations, is proportional to a value based on a bid and one or more parameters specified in the performance data 124. The highest ranked content items resulting from the auction can be selected and provided to the requesting user device 106.

In some implementations, the content item management system 120 includes a content item adjustment system 130 that adjusts the configuration of existing content items (e.g., width, height, font style, font size, background, borders, etc.) for use as overlays on images. The content item adjustment system 130 is described below with reference to FIG. 2A which shows a flow diagram of an example process 200 for providing a content item with a configuration adjusted for use as an overlay for an image. FIGS. 2B-2D show example content items 250-252 and content items with adjusted configurations.

Figure 2A:
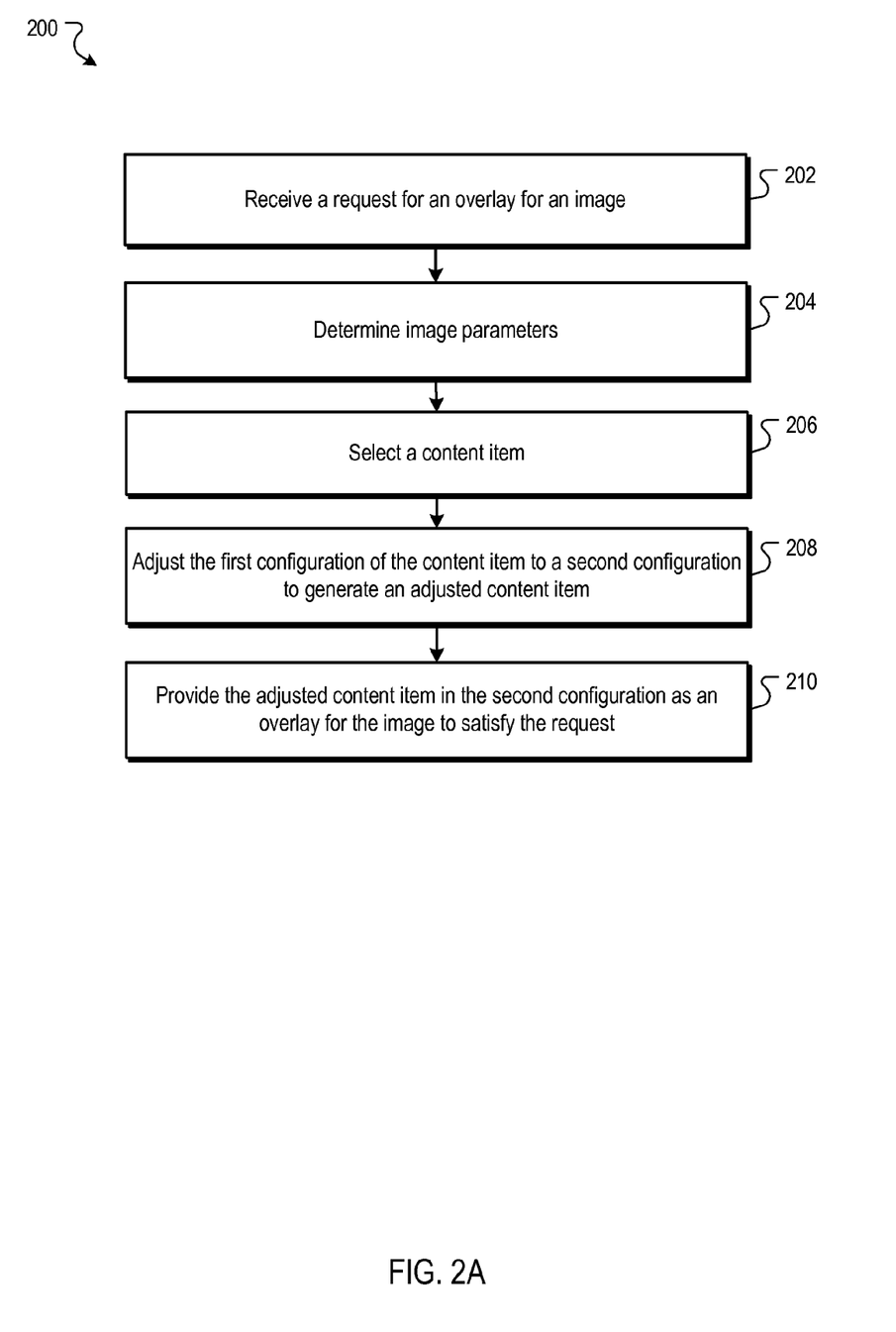
FIG. 2A is a flow diagram of an example process for providing a content item with a configuration adjusted for use as an overlay for an image.
Figure 2B:
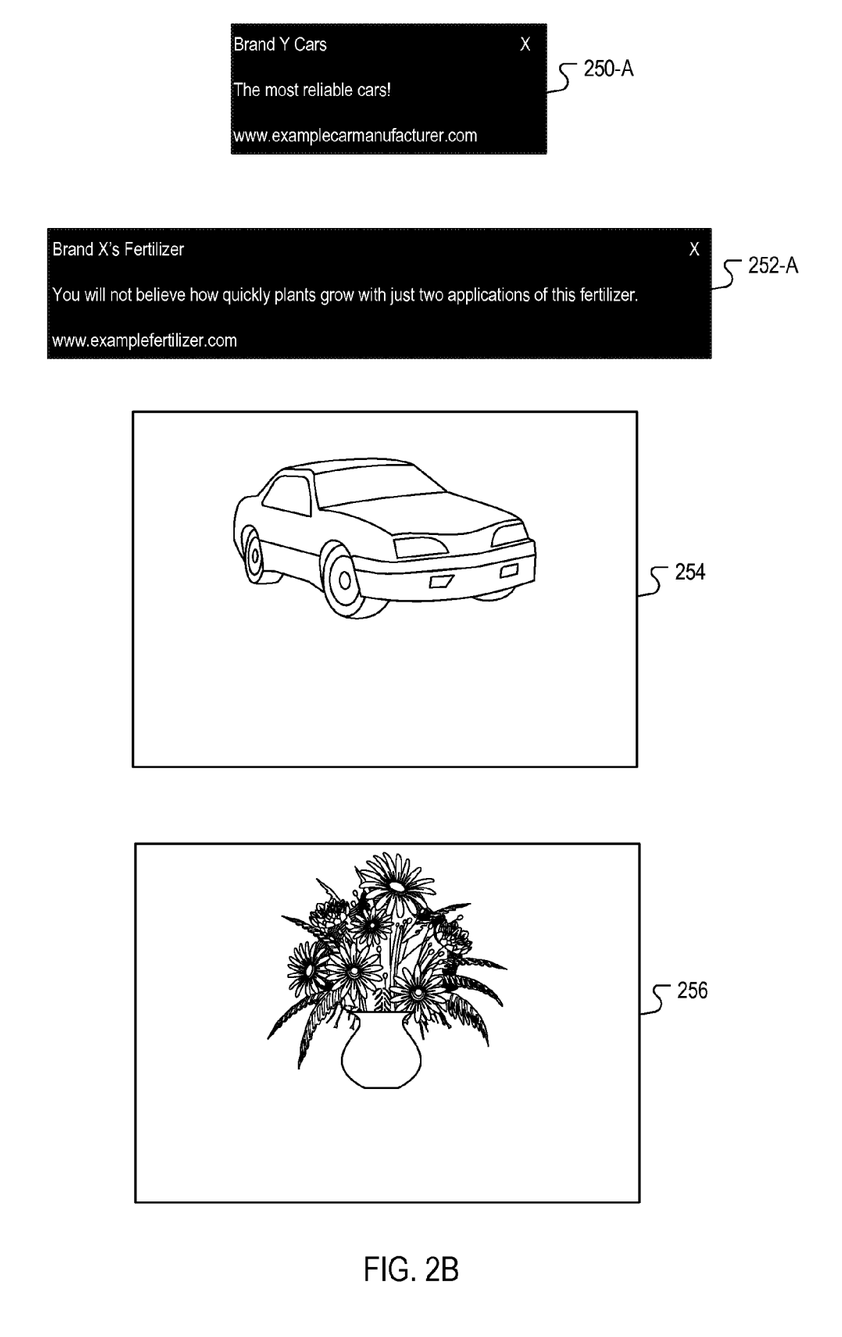
FIGS. 2B-2D show example content items and content items with adjusted configurations.
Figure 2C:
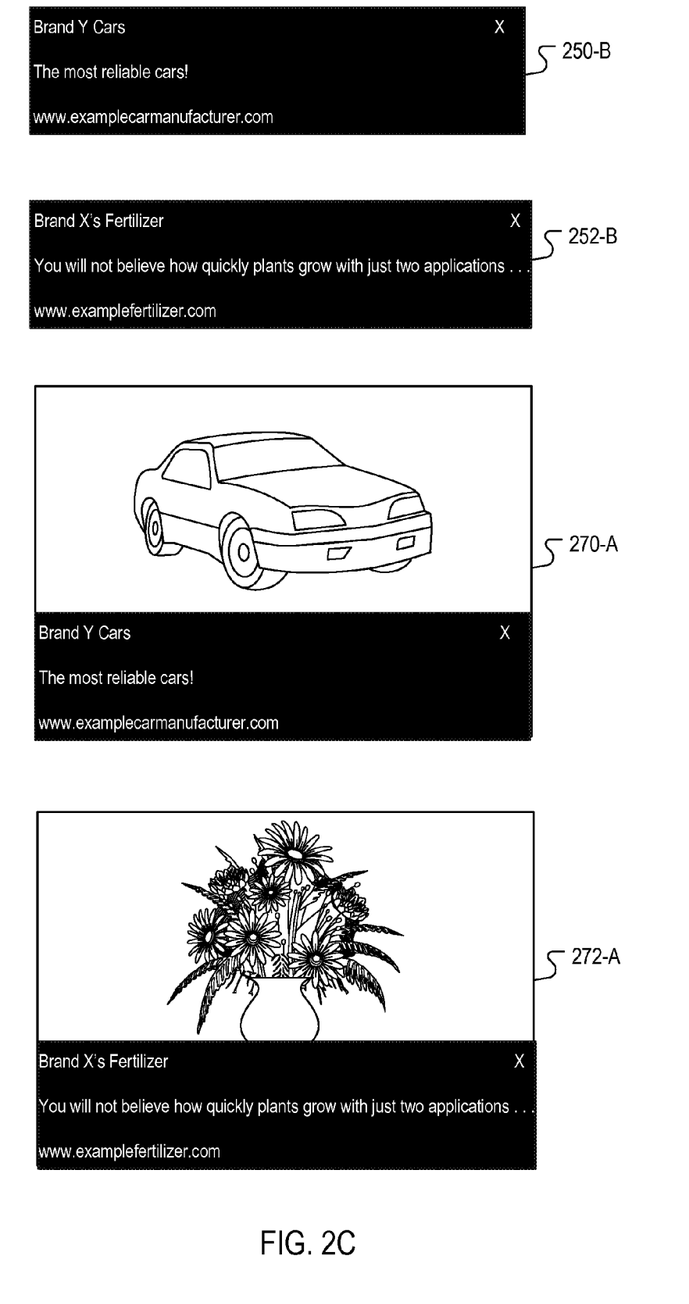
Figure 2D:
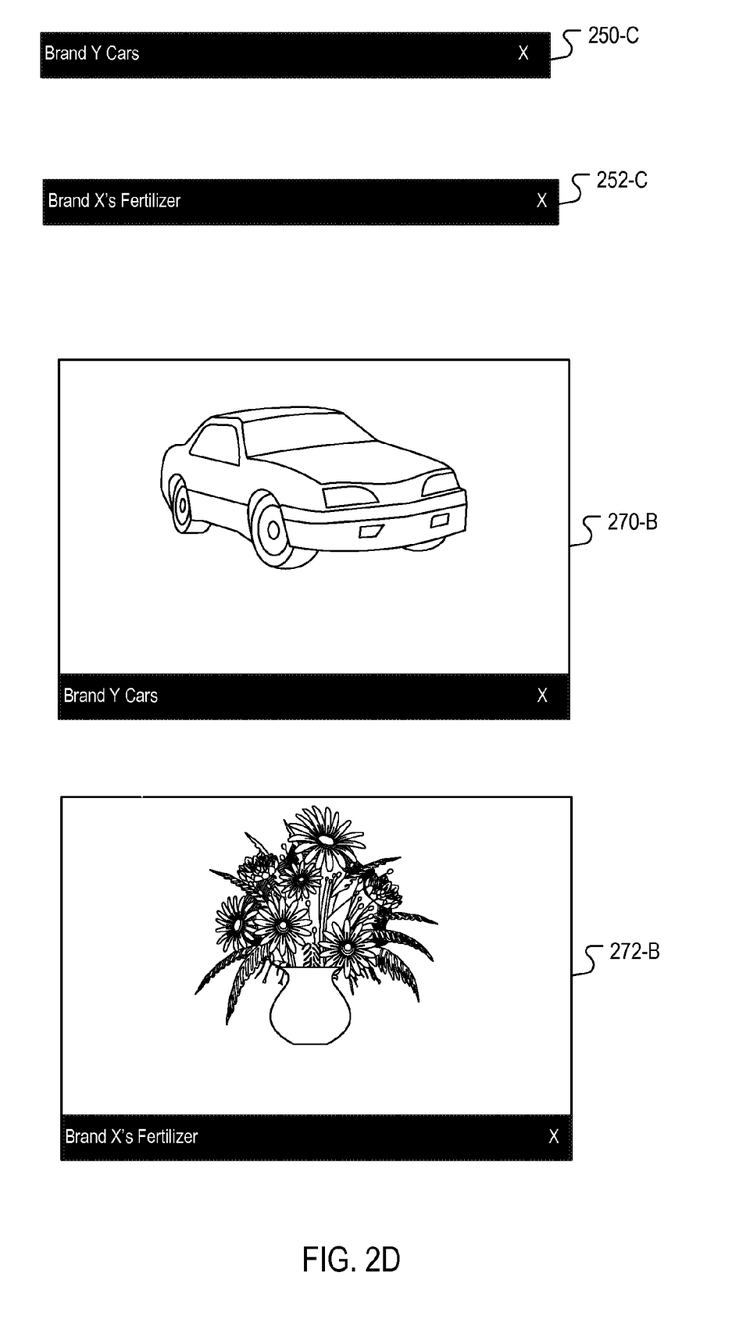

Referring to FIG. 2A, request data specifying a request for an overlay for an image are received (202). In some implementations, the content item adjustment system 130 receives the request for the overlay ("overlay request"). The overlay request can be generated by a user device 106 in response to the user device 106 accessing a resource 105 (e.g., the accessed resource 105 includes instructions that cause the user device 106 to send a content item request to the content item management system 120). For example, the user device 106 can access Web Page X which includes (hosts) images 254 (an automobile) and 256 (a floral arrangement) and submit an overlay request for a content item to overlay on one or both of the images 254 and 256 (e.g., a first advertisement to overlay on the image 254 and a second advertisement to overlay on the image 256).

In some implementations, an overlay is a content item (e.g., advertisement) that is "laid over" an image and covers up at least part of the image. Conceptually, the image can be thought of as residing on a bottom display layer and the overlay can be thought of as residing on a display layer on top of the bottom display layer such that the overlay is stacked on top of and covers up at least a portion of the image.

In some implementations, a request is received for a content item from a user device 106 accessing a resource 105. Responsive to the request, the content item adjustment system 130 can determine that an image on the resource 105, as described below, is eligible to be overlaid (e.g., the content item adjustment system 130 can query the search system 110/image data store 114 or the publisher of the resource 105 to determine that the resource 105 includes an eligible image). Thereafter, a determination may be made by the content item adjustment system 130 to provide an overlay for the image. At this point, the process can continue just as in the base scenario.

Image parameters specifying a plurality of dimensional aspects of the image (e.g., including a width of the image) are determined (204). The image parameters can be determined in numerous ways. In some implementations, the content item adjustment system 130 determines the image parameters from data included in or with the overlay request. For example, the instructions in Web Page X that cause the user device 106 to submit the overlay request can also include and cause the user device 106 to provide the image parameters for the images 254 and 256 in or with the overlay request. As such, the content item adjustment system 130 can parse the image parameters from the overlay request to determine the image parameters.

By way of another example, in some implementations, the content item adjustment system 130 receives the overlay request, which as described above can include a resource 105 identifier for the relevant resource 105, and queries the search system 110/image data store 114 (or the publisher of the resource 105 or a data store of previously received image parameters) to access the image parameters for images on the resource 105. For example, if the overlay request for the images 254 and 256 does not include the image parameters, the content item adjustment system 130 can query the image data store 114 with the resource 105 identifier for Web Page X from the overlay request to access or otherwise obtain the image parameters for the images 254 and 256.

The dimensional aspects of an image can include its width, height, and relative position and size with respect to other content or content items on the corresponding resource 105. The image parameters can be measured or defined, for example, in terms of pixels, or metric (e.g., centimeters) or SAE (e.g., inches) units. For example, the images 254 and 256 each have a width of 350 pixels and a height of 200 pixels. Image parameters in terms of number of pixels can be zoom-level and display screen size independent whereas image parameters in terms of metric and SAE units can be zoom-level and display screen size dependent.

A content item is selected from a plurality of content items relevant to the image (206). In some implementations, the content item management system 120 selects a content item from the content items in the campaign data 122, which includes various content items from one or more content sponsors. The content item management system 120 can determine that a content item is relevant to the image or the request based upon similarities or relatedness between keywords for the content item describing or relevant to its subject matter(s) or topic(s) (e.g., as specified by the content sponsor) and the subject matter(s) or topic(s) of the image. Other tools can be used for selecting the content item, such as tools for selecting relevant content to provide to a particular user device 106 (e.g., based on a cookie associated with the user device 106).

The subject matter or topic (or likely subject matter or topic) of an image can be determined in numerous ways. For example, the content item management system 120 and/or the search system 110 can determine or infer subject matter or topic of an image from the metadata associated with the image (e.g., a title or description of the image), from other content on the resource 105 hosting or presenting the image (e.g., textual content of the resource 105 such as headlines or captions of the image), from search queries for which search results were selected that referenced the image, from image analysis techniques such as scale invariant feature transforms (SIFT), edge detection, interest point detection, pixel matching, and other appropriate image analysis techniques, or some combination thereof.

In some implementations, the content item management system 120 categorizes publishers as either approved publishers or unapproved publishers with respect to publisher-specified metadata for the image. For example, publishers known to be very reputable (e.g., trusted or on a whitelist) can be categorized as approved publishers and publishers known to be disreputable or of an unknown reputation (e.g., not on a whitelist) can be categorized as unapproved publishers. For approved publishers, the content item management system 120 can use publisher-specified metadata in determining the subject matter of the image. For unapproved publishers, the content item management system 120 can disregard or appropriately weight the publisher-specified metadata in determining the subject matter of the image.

As described above, the content item management system 120 can determine that a content item is relevant to an image based upon similarities or relatedness between keywords for the content item and the subject matter or topic of the image. For example, the content item can be determined to be relevant to the image if a content item keyword is an exact match to a keyword associated with the subject matter of the image. By way of another example, the content item can be determined to be relevant to the image if a similarity measure (e.g., a semantic similarity) of the content item keyword and the keyword associated with the image is within a similarity threshold range (e.g., 90% similar). The content item management system 120 and/or the search system 110 can employ various techniques to generate a similarity measure, for example, based on clustering analyses, thesaurus-based analyses, or co-occurrence analyses to name just a few.

Once a set of content items has been identified as relevant to an image, the content item management system 120 can select one particular content item from the set, for example, based at least in part on rankings determined from the content sponsors' bids for the content items and the similarity measures between the content items and the image. The highest ranked content item (e.g., from an auction) can be selected as the content item for the overlay.

In some implementations, the selected content item may have a first configuration that is not appropriate or suitable for use as an overlay on the image. For example, the selected content item may be a three line text advertisement with a width of 468 pixels and a height of 60 pixels (e.g., first configuration) and the image may have a width of 350 pixels and a height of 200 pixels so that the advertisement is wider than the image. If the selected content item were to be overlaid on the image with its current configuration (e.g., the first configuration) it would extend beyond the extent (e.g., border) of the image onto content adjacent to the image. To avoid such a result, the content item adjustment system 130 can adjust the configuration of the selected content item. In some implementations, the content item adjustment system 130 can transform the configuration of the selected content from a first configuration to a second, different configuration suitable for use as an overlay for the image (e.g., the selected content item in the second configuration does not extend beyond the border of the image), as described below.

The first configuration of the content item is adjusted to a second, different configuration to generate an adjusted content item (208). As used herein, an adjusted content item is a content item in the second configuration. In some implementations, the content item adjustment system 130 adjusts the first configuration of the selected content item to a second, different configuration based at least in part on a comparison between the dimensions of the content item in the first configuration to the dimensions of the image. For example, the content item adjustment system 130 adjusts the width of the content item (in the first configuration) to a second width (in the second configuration) that is the same width as the width of the image without changing or distorting the perspective of content in the content item (e.g., the three lines of text in a three line text advertisement). Such an adjustment prevents the content item from "hanging off" the image when overlaid if the width of the content item exceeds that of the image. Conversely, if the width of the image exceeds that of the content item then adjusting the width of the content item to be that of the image would ensure the content item extends across the entirety of the image's width, for example, for aesthetic purposes.

The second configuration can also include other changes to the content item such as changes to the font or background color, size, style or transparency (e.g., based on the characteristics of the image that it will overlay or other content of the resource 105 on which the image is displayed such as the text surrounding the image). For example, the content item adjustment system 130 can change the font color of a content item from black to white if the portion of the image over which the content item will overlay is black or dark colored to better set off the text of the content item or change the font style of the font in the content item to match that of the text proximate to the image. By way of another example, the content item adjustment system 130 can adjust the transparency of the content item (or its content) in the second configuration to allow portions of the image that the adjusted content item overlays to be "seen" through the transparent or partially transparent portions of the adjusted content item. The content item adjustment system 130 can determine such adjustments based on an analysis of the content item and the image or their characteristics (e.g., from the image parameters or metadata for the image or content item).

The perspective of the content in the content item refers to the relationship of various components (terms, characters, graphical elements, etc.) of the content of the content item relative to each other. For example, if two characters in the content are five pixels apart and each is three pixels high in the first configuration then the same two characters can maintain that same relationship in the second configuration (e.g., except for any content that may be truncated in the second configuration as described below).

Content item 250 is, for example, in its first configuration as represented by the content item 250-A (e.g., in the form and configuration as previously provided to the content item management system 120). In the first configuration, content item 250-A has a width of 234 pixels and a height of 60 pixels. For example, the content item 250-A is a three line text advertisement previously provided or available to the content item management system 120 by the respective content sponsor.

When the content item 250 is selected to be an overlay for image 254, which has a width of 350 pixels and a height of 200 pixels, then the content item adjustment system 130, for example, compares the widths of the content item 250-A (the existing configuration of the content item 250) and the image 254 and determines that the width of content item 250-A is less than the width of the image 254 and needs to be extended to match that of the image 254. The content item adjustment system 130, for example, further determines that the height of the content item 250-A is within an acceptable range and does not need to be changed. In this example, the content item adjustment system 130 would extend the width of the content item 250-A to that of content item 250-B (on FIG. 2C), which has a width of 350 pixels to match that of the image 254 without changing the perspective of the content of content item 250. In the example shown, after the extension of the width (e.g., by 350-234=116 pixels), the three lines of text have the same perspective as they did prior to the adjustment/extension (e.g., the three lines of text and the characters of the three lines have the same spatial relationship to each other) even though one dimension of the content item was changed, width, while the others were not, (e.g., no adjustment of the height dimension).

The content item adjustment system 130 can extend the dimension of a content item in numerous ways. For example, the content item adjustment system 130 can align the left edge of the content item with the left edge of the image and extend the width of the content item by adding or appending a graphical element (e.g., a box or rectangle) to the right edge of the content item. The height of the appended graphical element can be the same as that of the content item and the width of the graphical element can be based on the difference in the width between the content item (e.g., in its first configuration) and that of the image. The content item adjustment system 130 can set the style of the graphical element (e.g., color, background, border, etc.) to be that of the content item so that the when the graphical element is appended to the content item there is no obvious demarcation between them.

In some implementations, as the content item is itself a graphical element, the content item adjustment system 130 can cause the width of the content item to be extended by adjusting/setting the width value of the content item to the desired width. Such adjustment/setting can cause, for example, the background of the content item to extend to the desired width without affecting any textual content in the content item (e.g., as it is not part of the background) thereby maintaining the perspective of the content item's content.

In some implementations, the content item selected as an overlay has a first configuration that causes the content item to extend beyond the borders of the image that it is selected to overlay. In such implementations, the content item adjustment system 130 can truncate the content item to cause the selected content item to "fit" within the borders of the image that it will overlay. Content item 252 is, for example, shown in a first configuration as represented by the content item 252-A. In the first configuration, content item 252-A has a width of 468 pixels and a height of 60 pixels. For example, the content item 252-A is a three line text advertisement with the first line being an advertisement title, the second line being the advertisement text and the third line being the uniform resource locator associated with the advertisement. If the content item 252 is selected to be an overlay for image 256, which has a width of 350 pixels and a height of 200 pixels, then the content item adjustment system 130, for example, compares the widths of the content item 252-A (the existing/first configuration of the content item 252) and the image 256 and determines that the width of content item 252-A is greater than the width of the image 256 and it needs to be truncated (e.g., reduced) to match that of the image 256. The content item adjustment system 130, for example, further determines that the height of the content item 252-A is within an acceptable range and does not need to be changed.

The content item adjustment system 130 truncates the content item 252-A to reduce its width to that of content item 252-B, which has a width of 350 pixels, to match that of the image 256. In some implementations, the truncation does not change the perspective of the content of content item 252-A. As shown in the example, after the truncation, the three lines of text have the same perspective as they did prior to the adjustment/truncation even though one dimension of the content item was changed, width, while the other was not, height. Further as the middle line of text had a width greater than that of the image, that line of text too is truncated and not "wrapped around" to the next line so as not to cause the addition of an extra line of text. Such an additional line of text would change the perspective of the content item's content. Rather, the content item adjustment system 130 can append a designator (e.g., ellipses) to the end of the middle line of text (e.g., the portion remaining after truncation) to indicate that text was truncated as shown in 252-B. In a similar manner, other content (e.g., other lines of text) in the content item can be truncated if it has a width greater than that of the content item 252-B (e.g., the content item 252 in its second configuration).

The content item adjustment system 130 can truncate the content item to reduce its dimensions in numerous ways. For example, the content item adjustment system 130 can align the left edge of the content item with the left edge of the image and truncate (e.g., crop) the rightmost portion of the content item that extends beyond the right border of the image. In some implementations, as the content item is itself a graphical element, the content item adjustment system 130 can cause the width of the content item to be truncated or reduced by adjusting/setting the width value of the content item (or its background) to the desired width. Such adjustment/setting can cause, for example, the boundaries of the content item to be reduced to the desired width without changing the perspective of the textual content in the content item.

In some implementations, if the amount/extent of content truncated from the content item exceeds a truncation threshold, the content item adjustment system 130 will not permit the truncation (e.g., will not permit the content item to be eligible to overlay the image) as, for example, the truncation may result in too little or ambiguous information being conveyed by the adjusted content item. For example, one line of text in a content item in a first configuration (e.g., before adjustment) recites "You will not believe how quickly plants grow with just two applications of this fertilizer," and after adjustment/truncation the line of text recites "You will not believe how quickly . . . . " Thus the line of text is likely, for example, ambiguous or does not convey the message intended by the content sponsor. As such, the content item adjustment system 130 can determine that the content item cannot be used as an overlay on an image that would cause such a truncation (e.g., cause a truncation that exceeds a truncation threshold). Alternatively, a different truncation methodology can be employed (e.g., one that satisfies the threshold).

In some implementations, the content item adjustment system 130 determines whether a truncated portion of the content of a content item (e.g., a truncated line of advertisement text) exceeds or does not exceed a truncation threshold based on a ratio of the portion of truncated content to the portion of content that was not truncated (e.g., on width basis). For example, the content item adjustment system 130 compares the portion of a line of text that was truncated (e.g., the width of or a number of characters in the truncated portion) to a portion of the line of text that was not truncated (e.g., the width of or a number of characters in the portion not truncated/remaining), and determines whether the truncation exceeds or does not exceed a truncation threshold based on the comparison. For example, the truncation threshold can be a maximum value for a ratio of the truncated portion of content to the portion of that content not truncated or to the total width of the content prior to truncation.

If the comparison indicates that the truncation threshold was not exceeded then the adjusted content item (e.g., the content item in its second configuration) is eligible for use as an overlay on the particular image. Conversely, if the comparison indicates the truncation threshold was exceeded then, in some implementations, the adjusted content item is not eligible for use as an overlay on the particular image (but may be eligible for use as an overlay on other images with greater widths than the particular image as less of the content item may need to be truncated for those other images). In some implementations, the adjusted content item is not eligible for use as an overlay on a particular image if the adjustment of the content item's configuration causes certain portions of the content of the content item to be truncated. For example, with respect to a three line advertisement, if the advertisement title is truncated (at all) to fit a particular image, the adjusted content item will be deemed ineligible for use as an overlay for that particular image.

The adjusted content item in the second configuration is provided as an overlay for the image to satisfy the overlay request (210). For example, if the adjusted content item is eligible based on any applicable truncation thresholds or content sponsor or publisher criteria, then the content item adjustment system 130 can provide the adjusted content to the requesting user device 106. In turn, the requesting user device 106 can cause the adjusted content item to be displayed as an overlay to the corresponding image. For example, with reference to FIG. 2C, overlaid display 270-A shows content item 250-B overlaid on the image 254 and overlaid display 272-A shows content item 252-B overlaid on the image 256.

In some implementations, the content items overlaid on the image can include (or can otherwise be provided with) a user-selectable action element (e.g., button) that upon selection causes the removal of the overlay from the image (or otherwise causes the content item overlay not to obstruct the image that it overlays). For example, the content item 250-B overlaid on display 270-A can be "removed" from the image 254 by a user selection of the "X" button in the upper right hand corner of the content item 250-B.

In some implementations, when an adjusted content item has been removed as an overlay to an image (e.g., by user selection of the "X" button), the adjusted content item can be "re-overlaid" on the image in response to the user indicating an interest or renewed interest in the image or adjusted content item. For example, mousing over (e.g., causing a cursor to hover over) the image can cause a re-overlay selection element to be displayed (e.g., a selectable button displayed on the image). User selection of the re-overlay selection element can cause the adjusted content item to be re-overlaid on the image (e.g., in the expanded state).

Resources 105 (e.g., web pages) can, for example, include an image window (e.g., an image viewer) through which a gallery of images can be presented (e.g., one at a time). For example, a user can cause a particular image in the gallery to be presented in the image window through the use of "next" and "previous" image selection elements (e.g., buttons). Thus, for example, if a first image in an image gallery is presented in the image window, a user can cause the first image to be replaced in the image window by a second image from the image gallery through selection of the "next image" button. In some implementations, upon presentation in the image window each image in the image gallery can be overlaid with an adjusted content item.

In some implementations, when an adjusted content item has been removed as an overlay to an image (e.g., by user selection of the "X" button) in the image gallery presented in the image window, subsequent images presented in the image window will not be overlaid unless a re-overlay selection element is selected. Thus, for example, if an adjusted content item is removed as an overlay from an image presented in the image window, and a user causes another image (e.g., the next image in the image gallery) to be presented in the image window that image (e.g., the next image and all subsequent gallery images presented in the image window) will not be overlaid until the re-overlay selection element is selected or until another browsing session begins (e.g., the user device 105 accesses the resource 105 through another instantiation of its browser application).

In some implementations, the adjusted content item can initially be overlaid on the image in an expanded state and then, after a specified time period or a user interaction, can be collapsed to a collapsed state. This allows the full content of the adjusted content item, for example, to be presented for some period of time in the expanded state and then, after the adjusted content item is collapsed, allows more of the image to be visible (e.g., as the collapsed state obscures less of the image than the expanded state). An expanded state can be a state or form of the content item after it is adjusted to the second configuration (e.g., the expanded state can be the second configuration). For example, the adjusted content items 250-B and 252-B are in an expanded state (e.g., all three lines of text are shown except for any text truncated during the adjustment process).

A collapsed state can be a state of the adjusted content item that covers or overlays less of the image than does the adjusted content item in the expanded state. The collapsed state can be a state or form of the adjusted content item with a height that is less than that of the same adjusted content item in the expanded state, which can reduce the amount of content of the adjusted content item shown in its expanded state. For example, if the adjusted content item in the expanded state shows three lines of text, the adjusted content item in the collapsed state can have a height less than that in the expanded state and present only one line of text. With reference to FIG. 2D, the adjusted content items 250-C and 252-C are in a collapsed state (e.g., only one line of text is shown). The content item adjustment system 130 can generate or cause to be generated the collapsed state in a manner similar to that described above with reference to generating adjusted content items from the corresponding content items.

As describe above, the adjusted content item can initially be overlaid on the image in an expanded state as shown by overlaid displays 270-A and 272-A. In contrast, overlaid displays 270-B and 272-B show the respective content items in a collapsed state. In some implementations, in response to the overlay request, the content item adjustment system 130 provides both the adjusted content item in an expanded state and in a collapsed state with instructions specifying the conditions under which the displaying user device 106 should display each. For example, the conditions can be time based (e.g., initially display the adjusted content item in an expanded state for five seconds and thereafter in a collapsed state), or user action based (e.g., initially display the adjusted content item in a collapsed state until the user selects, mouses over or otherwise indicates an interest in the image or adjusted content item and then display the adjusted content item in an expanded state, at least for a certain period of time before reverting to the collapsed state), or a combination thereof. In some implementations, the adjusted content item is not responsive to user selections for some period of time after it is initially rendered (e.g., 0.5 seconds) on the user device 106 to prevent or reduce the likelihood of accidental or inadvertent user selections.

In some implementations, the instructions provided to the user device 106 regarding rendering/displaying the adjusted content items on the images include instructions not to render an adjusted content item (e.g., in the expanded state or not at all) until or if the image that it will overlay is displayed in the viewport of the user device (e.g., actually displayed to the user). Such instructions, for example, prevent an impression of the adjusted content item from occurring without the adjusted content item actually being perceivable or viewable to the user. Similarly, such instructions can limit the display of the overlay where only a portion of the image is included in the viewport, such portion not including an area associated with the overlay.

In some implementations, the instructions provided to the requesting user device with the adjusted content item include instructions to render the adjusted content item in a collapsed state until the image is displayed (e.g., fully displayed) in the viewport of the user device and then render/display the adjusted content item in the expanded state (at least for a certain period of time before reverting to the collapsed state).

As described above, some content items may not be eligible to be an overlay if the truncation threshold is exceeded. In some implementations, there can be other criteria or restrictions preventing content items from being eligible to be an overlay on particular images. For example, the content item adjustment system 130 can provide a user interface to a content sponsor (e.g., a web page based user interface) to allow the content sponsor to enable or disable particular content items, content groups or campaigns to be used as an overlay. If, for example, a content sponsor has disabled certain content items from being used as overlays or otherwise indicated that the content items should not be used as overlays, then the content item adjustment system will deem those content items ineligible for an overlay program.

The portion of an image covered or obscured by an adjusted content item can also be a factor or criterion in determining whether a particular adjusted content item can be used as an overlay for a particular image. For example, the content item adjustment system 130 may require (e.g., as directed by an administrator of the system 130 or publisher) that to be eligible for use as an overlay on an image the height of the adjusted content item in the expanded state cannot exceed some portion (e.g., thirty percent) of the height of the relevant image (e.g., to prevent too much of the image being obscured by the adjusted content item).

In some implementations, restrictions can also exist that enable only one adjusted content item be presented on or rendered by a user device 106 in an expanded state at a particular time. For example, if a first adjusted content item is displayed in an expanded state and a user selects a second adjusted content item in a collapsed state to cause it to be presented in the expanded state, the instructions provided to the user device 106 can cause the first adjusted content item to collapse to a collapsed state in response to the user selecting the second adjusted content item and causing the presentation of the second adjusted content item in its expanded state. In this example only one adjusted content item is displayed in an expanded state at a time.

Requirements can also be specified (e.g., by the system, the content sponsor or the publisher) for an image to be able to be considered eligible to have an overlay of an adjusted content item. For example, there can be minimum requirements on the image's height or width such that if the minimum requirements are not satisfied the image is not eligible to be overlaid (e.g., as determined by the content item adjustment system 130 from an analysis of the image's image parameters). For example, an image may be required to have a width of at least 250 pixels to be eligible to be overlaid. Such a requirement can, for example, prevent dimensionally small images (e.g., thumbnails) from being eligible to be overlaid as it is likely that the content of the adjusted content item would be difficult to discern on small images and the content sponsor may not receive the expected benefit from an impression of the adjusted content item.

The eligibility of an image to be overlaid and a content item to be an overlay can vary, for example, as a browser application of the user device 106 in which the image is rendered is re-sized or otherwise changed, which can also affect the displayed dimensions of the image. For example, when a browser application displaying an overlaid image is re-sized by a user (which also causes the image to be re-sized), the content item adjustment system 130 can dynamically adjust the configuration of the adjusted content item to a configuration to fit the re-sized image (e.g., expand or reduce the width of the adjusted content item) in a manner similar to that described in process 200. For example, if an image overlaid with a content item is re-sized to have a width of 100 pixels (e.g., from a width of 350 pixels), by the browser application displaying the image being re-sized, the user device 106 can provide the parameters of the re-sized browser (and/or the re-sized image) to the content item adjustment system 130 and request the content item with a configuration adjusted to "fit" the re-sized image. In turn, the content item adjustment system 130 can, for example, iterate through processes 208 and 210 to adjust the configuration of the content item based on the re-sized browser or image parameters and return the adjusted content item to the requesting user device 106. If the re-sizing of the image causes the image or the adjusted content item to not meet an overlay requirement of the image or the adjusted content item then the content item adjustment system 130 can, for example, prevent the adjusted content from being overlaid on the re-sized image. When the image is further re-sized, any overlay requirements can be re-evaluated and if the requirements are satisfied after the further re-sizing, the adjusted content item can once again be overlaid on the image in a suitable configuration.

Further, some publishers may prefer that images on their resources 105 not be overlaid. In some implementations, the content item adjustment system 130 can provide a user interface to a publisher (e.g., a web page based user interface) to allow the publisher to select whether or not content items can be overlaid on images on its resources 105. For example, the interface can allow the publisher to select particular images or groups of images that are not to be overlaid or can be overlaid, or select a categorical prohibition or approval on overlaying any of the publisher's images.

Although the above description focused on textual content items such as three line advertisements, the systems and techniques described herein are equally applicable to other types of content items such as image advertisements or content items with both text and image content. For example, in some implementations, the content item adjustment system 130 can adjust the configuration of image content items (e.g., image advertisements) to fit that of the images that they will overlay by adjusting the dimensions of the image content items without distorting their content (e.g., a proportional increase/decrease of the width and height of the image content item). By way of another example, the content item adjustment system 130 can detect a background (or other nonessential portion) of the image content item (e.g., through analysis of the image content as described above) and expand or reduce the background (or other) portion of the image content item (but not the image content corresponding to the primary subject matter of the image content item) to adjust the image content item to fit an image that it will overlay.

Further, the above examples described adjusting a content items width to match that of the image that is has been selected to overlay. However, in some implementations, the content item can be adjusted to be less than the entire width of the image (e.g., 75% of the width) or can be adjusted, additionally or alternatively, to cover or overlay a certain portion of the image's height or a certain portion of the image's area. Moreover, in some implementations, an adjusted content item can be overlaid on other portions of an image, such as the top of the image or a side of the image.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 3:
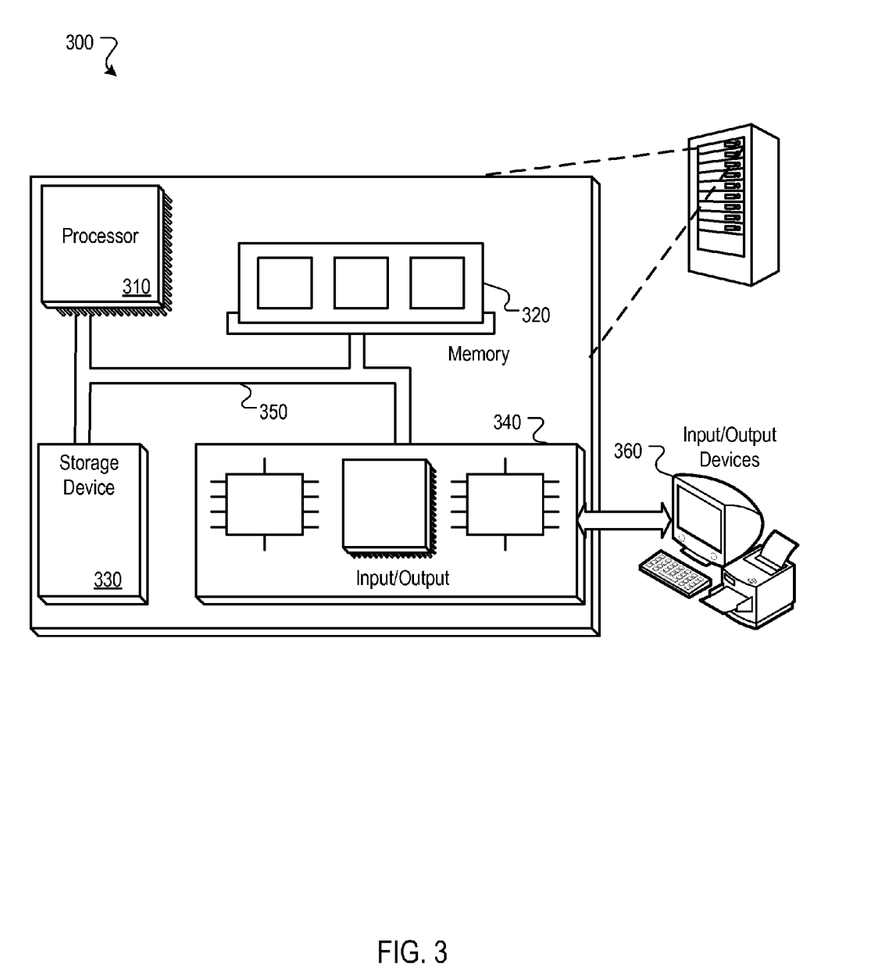
FIG. 3 is a block diagram of a programmable processing system.

An example of one such type of computer is shown in FIG. 3, which is a block diagram of a programmable processing system 300 (system). The system 300 that can be utilized to implement the systems and methods described herein. The architecture of the system 300 can, for example, be used to implement a computer client, a computer server, or some other computer device.

The system 300 includes a processor 310, a memory 320, a storage device 330, and an input/output device 440. Each of the components 310, 320, 330, and 340 can, for example, be interconnected using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 can, for example, include a hard disk device, an optical disk device, or some other large capacity storage device.

The input/output device 340 provides input/output operations for the system 300. In one implementation, the input/output device 340 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 360.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
receiving request data specifying a request for an overlay for display over an image;
determining image parameters specifying a plurality of dimensional aspects of the image including a width of the image;
selecting, from a plurality of content items relevant to the image, a given content item, having a first configuration with a given set of textual content comprising at least one line of text, each line of text displayed at a first font size, and having a given spatial relationship between lines and characters in the given set of text, the first configuration specifying a first width of the given content item within which the given set of textual content is located, wherein the first width is greater than the width of the image;
reformatting, by one or more data processors, the given content item using a second configuration to generate an adjusted content item, the reformatting including adjusting the given content item to have a second different width based on the width of the image, while maintaining the given spatial relationship between lines or characters of the given set of textual content in each of the first configuration and the second configuration, displaying the textual content at or greater than the first font size, and truncating the at least one line of text to fit within the width of the image; and
providing the adjusted content item in the second configuration as an overlay that covers a portion of the image, wherein the overlay includes a control element that allows independent closing of the overlay while maintaining display of the image.

2. The method of claim 1, wherein the first width and the width of the image are in terms of pixels.

3. The method of claim 2, wherein the content of the content item comprises multiple lines of text and providing the adjusted content item comprises:
providing instructions to present the adjusted content item in an expanded state including the multiple lines of text during a first period of time and to present the adjusted content item in a collapsed state having fewer than all of the multiple lines of text after the first period.

4. The method of claim 1, further comprising determining that the truncated line of text does not exceed a truncation threshold based on ratio of a portion of the at least one line of text that was truncated to a portion of the at least one line of text that was not truncated, and wherein adjusting the first configuration of the content item comprises adjusting the first configuration of the content item in response to determining that the truncated line of text does not exceed the truncation threshold.

5. The method of claim 1, wherein selecting a content item comprises selecting the content item in response to determining that a publisher of the image is participating in an overlay program.

6. The method of claim 1, wherein determining image parameters comprises accessing the image parameters from a data store.

7. The method of claim 1, wherein the content item is an image advertisement.

8. The method of claim 1, wherein the content item is a text advertisement.

9. The method of claim 1, wherein selecting a content item comprises:
analyzing content of the image; and
selecting the content item, which has a subject matter that is relevant to the content of the image, based at least in part on the analysis.

10. The method of claim 1, wherein selecting a content item comprises:

determining a publisher of the image is an approved publisher;
accessing metadata for the image specified by the publisher; and
in response to determining the publisher is an approved publisher, selecting the content item based at least in part on the metadata for the image.

11. The method of claim 1, wherein selecting a content item comprises:
analyzing textual content associated with the image; and
selecting the content item, which has a subject matter that is relevant to the textual content associated with the image, based at least in part on the analysis.

12. The method of claim 1, further comprising:
providing an interface to a publisher of the image allowing the publisher to select whether or not content items can be overlaid on the image.

13. The method of claim 1, further comprising providing an interface to a content sponsor for enabling a content item in a campaign to be used as an overlay.

14. A method comprising:
identifying image data for display of an image on a user device;
evaluating the image data including determining one or more matching criteria related to content included in the image data;
identifying an overlay for placement on top of the image data including conducting an auction to identify a sponsored content item from eligible sponsored content items based at least in part on the matching criteria, wherein the sponsored content item comprises at least one line of text and each line of text displayed at a first font size;
transforming the identified sponsored content item to produce an overlay item, the transforming including changing a width of the identified sponsored content item while maintaining a same spatial relationship between characters of the lines of text, displaying the characters of the text at or greater than the first font size, and truncating the lines of text to fit within the width of the image; and
providing the transformed sponsored content item for presentation along with the image data and code that causes the transformed content item to be displayed over a portion of the image, wherein the overlay includes a control element that allows independent closing of the overlay while maintaining display of the image.

15. A system comprising:
one or more data processors; and
instructions stored on a computer readable storage medium that when executed by the one or more data processors cause the one or more data processors to perform operations comprising:
receiving request data specifying a request for an overlay for display over an image;
determining image parameters specifying a plurality of dimensional aspects of the image including a width of the image;
selecting, from a plurality of content items relevant to the image, a given content item, having a first configuration with a given set of textual content comprising at least one line of text, each line of text displayed at a first font size, and having a given spatial relationship between lines or characters in the given set of text, the first configuration specifying a first width of the given content item within which the given set of textual content is located, wherein the first width is greater than the width of the image;
reformatting, by one or more data processors, the given content item using a second configuration to generate an adjusted content item, the reformatting including adjusting the given content item to have a second different width based on the width of the image, while maintaining the given spatial relationship between lines or characters of the given set of textual content in each of the first configuration and the second configuration, displaying the textual content at or greater than the first font size, and truncating the at least one line of text to fit within the width of the image; and
providing the adjusted content item in the second configuration as an overlay that covers a portion of the image, wherein the overlay includes a control element that allows independent closing of the overlay while maintaining display of the image.

16. The system of claim 15, wherein the instructions when executed by the one or more data processors cause the one or more data processors to further perform operations comprising:
determining that the truncated line of text does not exceed a truncation threshold based on ratio of a portion of the at least one line of text that was truncated to a portion of the at least one line of text that was not truncated, and wherein adjusting the first configuration of the content item comprises adjusting the first configuration of the content item in response to determining that the truncated line of text does not exceed the truncation threshold.

17. The system of claim 15, wherein the content of the content item comprises multiple lines of text and providing the adjusted content item comprises:
providing instructions to present the adjusted content item in an expanded state including the multiple lines of text during a first period of time and to present the adjusted content item in a collapsed state having fewer than all of the multiple lines of text after the first period.

18. A computer program product, encoded on one or more non-transitory memory storage devices, including instructions that when executed by one or more data processing apparatuses cause the one or more data processing apparatuses to perform operations comprising:
receiving request data specifying a request for an overlay for display over an image;
determining image parameters specifying a plurality of dimensional aspects of the image including a width of the image;
selecting, from a plurality of content items relevant to the image, a given content item, having a first configuration with a given set of textual content comprising at least one line of text, each line of text displayed at a first font size, and having a given spatial relationship between lines or characters in the given set of text, the first configuration specifying a first width of the given content item within which the given set of textual content is located, wherein the first width is greater than the width of the image;
reformatting, by one or more data processors, the given content item using a second configuration to generate an adjusted content item, the reformatting including adjusting the given content item to have a second different width based on the width of the image, while maintaining the given spatial relationship between lines or characters of the given set of textual content in each of the first configuration and the second configuration, displaying the textual content at or greater than the first font size, and truncating the at least one line of text to fit within the width of the image; and providing the adjusted content item in the second configuration as an overlay that covers a portion of the image, wherein the overlay includes a control element that allows independent closing of the overlay while maintaining display of the image.

* * * * *